United States Patent [19]

Scholz

[11] Patent Number: 4,697,853

[45] Date of Patent: Oct. 6, 1987

[54] PRESSURE-MEDIUM BRAKING SYSTEM FOR VEHICLES

[75] Inventor: Helmut Scholz, Bischweier, Fed. Rep. of Germany

[73] Assignee: Daimler-Benz Aktiengesellschaft, Fed. Rep. of Germany

[21] Appl. No.: 831,556

[22] Filed: Feb. 21, 1986

[30] Foreign Application Priority Data

Feb. 23, 1985 [DE] Fed. Rep. of Germany ....... 3506419

[51] Int. Cl.$^4$ .................. B60T 13/68; B60T 17/04
[52] U.S. Cl. ........................... 303/7; 188/3 R; 188/112 R; 303/20; 303/15
[58] Field of Search .......................... 303/2–4, 303/6 R, 6 A, 6 M, 7–9, 13–17, 20, 50–56, 71, DIG. 3, 47, 25–26, 100, 91, 22 R; 188/106, 170, 3 H, 3 R, 156–165, 171, 112, 16, 354; 364/424, 426

[56] References Cited

U.S. PATENT DOCUMENTS

| 3,168,352 | 2/1965 | Stelzer | 303/7 |
| 3,256,045 | 6/1966 | Stelzer | 303/7 X |
| 3,497,267 | 2/1970 | Dobrikin | 303/3 X |
| 3,507,542 | 4/1970 | Cannella | 303/3 X |
| 4,478,459 | 10/1984 | Cumming | 303/7 |
| 4,568,129 | 2/1986 | Stumpe | 303/22 R X |
| 4,585,278 | 4/1986 | Grauel et al. | 303/7 |
| 4,616,881 | 10/1986 | Müller et al. | 303/22 R X |

FOREIGN PATENT DOCUMENTS 3149110  6/1983  Fed. Rep. of Germany ........ 303/15

Primary Examiner—Douglas C. Butler

[57] ABSTRACT

A multiple-circuit pressure-medium braking system for vehicle and trailer combinations that increases safety by allowing the front-wheel brake, the rear-wheel brake and the trailer brake to respond simultaneously. The system comprises electrical control circuits and pressure medium circuits which are controlled by the electrical control circuits. Each pressure-medium circuit has its own electrical circuit assigned to it. The trailer brake valve is controlled by an electrical signal from an one of the electrical control circuits. This is in addition to the direct pneumatic control of the trailer brake valve by the trailer control valve, and allows for the simultaneous braking of the trailer and the vehicle.

18 Claims, 2 Drawing Figures

PRESSURE-MEDIUM BRAKING SYSTEM FOR VEHICLES

BACKGROUND AND SUMMARY OF THE INVENTION

The invention relates to a multiple-circuit pressure-medium braking system for vehicle and trailer combinations.

An example of a multiple-circuit pressure-medium braking system for vehicles which is controlled by multi-circuit safety valve is shown in German Offenlegungsschrift No. 3,149,110. In this system, the foot-brake pedal actuates a signal generator which applies an electrical signal to the valve of the front-wheel brake through a first electrical circuit that is supplied by a first battery. By means of this signal, the pressure medium of the first pressure-medium circuit is regulated by the valve of the front-wheel brake and thereby actuates the brake cylinders of the front-wheel brake.

The signal generator actuated by the foot-brake pedal in this system also applies the electrical signal to the valve for the rear-wheel brake through a second electrical circuit supplied by a second battery, so that the pressure-medium of the second pressure-medium circuit is regulated and the brake cylinders of the rear-wheel brake are actuated.

A signal generated by the signal generator for the parking brake is applied to the valve for the parking brake by means of a third electrical circuit supplied from the first and second electrical circuits. This valve regulates the pressure-medium of the third pressure-medium circuit which actuates the cylinders of the parking brake.

Lastly, the trailer control valve is connected to the two electrical circuits of the service brake and, through a further electrical connection, to the signal generator for the parking brake. The trailer control valve regulates the pressure-medium which is supplied to the third pressure-medium circuit through a supply line branched off from this circuit. By means of the regulated pressure-medium, the brake valve in the trailer is controlled by a coupling head.

A disadvantage of the above system is that the electrical control system has only two circuits, supplied by only two independent batteries, even though three pressure-medium circuits are provided for the safety of the braking system. If a battery fails, it is no longer possible to control at least a part of the braking system.

Another disadvantage is the number of different valves in the system, some of which are controlled by two or even three electromagnets. Valves of this type are of complicated design and are relatively expensive. Moreover, a trailer control valve controlled by three electromagnets is technically difficult to produce, since signals of different polarities are applied to the trailer control valve from the service-brake circuits and from the brake circuit of the parking brake.

A further disadvantage is that the trailer brake reacts only after a long response time, since the brake valve of the trailer brake is controlled by the regulated pressure-medium of the trailer control valve. Also, because of the delayed build-up of the control pressure there exists the danger that the trailer will not be braked when the vehicle is braked. The lack of contact-breaking protection is an additional disadvantage.

Numerous proposals have been made for reducing the time delay between tractor and trailer brake initiations with electrical means.

An object of the present invention is the development of a multiple-circuit pressure-medium braking system for vehicles which is controlled by a multi-circuit safety valve arrangement, that guarantees maximum possible safety by allowing the front-wheel brake, the rear-wheel brake and particularly the trailer brake to respond at the same time.

This and other objects of preferred embodiments of the invention are attained by providing a multiple circuit pressure-medium braking system for vehicle and trailer combinations with a plurality of pressure-medium circuits, a pressure-medium supply means for supplying a pressure-medium, and a plurality of electrical circuits. Each electrical circuit controls the flow of the pressure-medium in a corresponding pressure-medium circuit. Also provided is a trailer brake valve for controlling the supply of pressure-medium to the brake cylinder of the trailer, and a trailer control valve which is fluidically connected to the trailer brake valve and fluidically controls the operation of the trailer brake valve. Further, a means for indirectly controlling the operation of the trailer brake valve is provided.

In advantageous preferred embodiments of the invention, it is provided that each electrical circuit is provided with its own battery in addition to the vehicle battery with this arrangement, in the event that either an additional battery or the vehicle battery fails, the braking system remains fully functional, thus guaranteeing maximum possible safety. Furthermore, the braking system also functions on vehicles delivered without a vehicle battery, with the result that maneuvering becomes possible, this being especially advantageous when transport vehicles are loaded and unloaded by means of such maneuvering.

A further substantial advantage of preferred embodiments of the invention is that the brake valve in the trailer, in addition to being controlled fluidically, is also controlled electrically, thereby making it possible for the trailer to be braked at the same time as the motor vehicle. In particular, this prevents the trailer from colliding into the back of the motor vehicle.

Further features of preferred embodiments of the present invention provide further additional advantages. For example, by means of an electrical variable resistor, a signal inversely proportional to the pressure of the vehicle parking brake is formed, as a result of which the trailer control valve can be controlled by signals of the same polarity both from the service brake and from the parking brake.

According to advantageous features of preferred embodiments, a one-way valve prevents automatic actuation of the vehicle parking brake if a defect in a pressure-medium circuit occurs during driving.

Further objects, features, and advantages of the present invention will become more apparent from the following description when taken with the accompanying drawings, which show for purposes of illustration only, an embodiment constructed in accordance with the present invention.

DETAILED DESCRIPTION OF THE DRAWINGS

Figure 1:
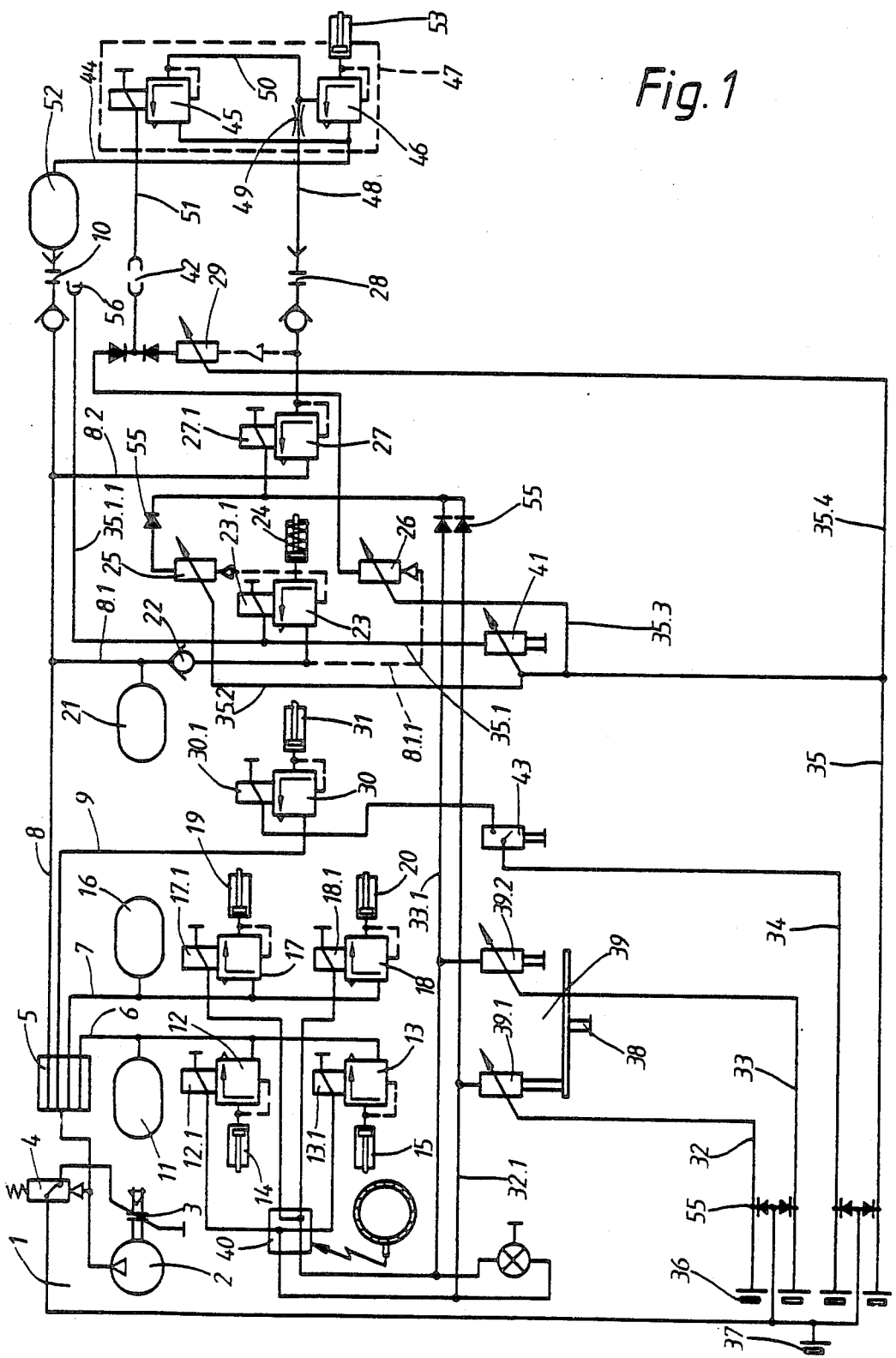
FIG. 1 shows a schematic circuit diagram of a pressure-medium braking system for motor vehicles constructed in accordance with a preferred embodiment of the present invention.

The preferred embodiment of the four-circuit pressure-medium braking system illustrated in FIG. 1 contains a pressure-medium supply device 1 comprised of a compressor 2, an electrical coupling 3 and one or more pressure switches 4. The pressure-medium supply device 1 is followed in flow direction by a multi-circuit safety valve 5. Four pressure-medium supply lines 6, 7, 8 and 9 extend from this safety valve 5, the first line 6 being intended for supplying the service-brake circuit of the front-wheel brake. The second supply line 7 supplies the service-brake circuit of the rear-wheel brake. The third supply line 8 is connected to a supply-line coupling head 10 for supplying the trailer brake with pressure-medium, and the fourth 9 is connected to a secondary consumer 31. Additional secondary consumers can be connected via further supply lines, and these secondary consumers can be, for example, an engine brake, a gear-shift mechanism, a clutch or a door actuation system.

The first supply line 6 leads through a storage vessel 11, to the two valves 12 and 13 for the front-wheel brake, to each of which a brake cylinder 14 and 15 is connected.

The second supply line 7 is in turn connected through a storage vessel 16 to the two valves 17 and 18 for the rear-wheel brake, to which the brake cylinders 19 and 20 are connected.

A first branch line 8.1 branches off from the third supply line 8 and leads, through a storage vessel 21 and a one-way valve 22, to the valve 23 for the parking brake. A spring-loaded brake cylinder 24 is connected by a first branch to the pneumatic outlet of the valve 23. An electrical variable resistor 25 is subjected to the pressure-medium via a second branch at the pneumatic outlet of the valve 23. A further line 8.1.1 branching off from the branch line 8.1 is connected to the variable resistor 26. The second branch line 8.2 leads to the trailer control valve 27, the pneumatic outlet of which is connected to the control-line coupling head 28, and additionally, to a further electrical variable resistor 29 which is subjected to the pressure-medium by another branch line.

The fourth supply line 9 is connected to the valve 30, to which a secondary consumer 31 is connected.

The control part of the pressure-medium braking system of the illustrated preferred embodiment of the present invention is electrical and is described below.

Each pressure-medium circuit 6, 7, 8 and 9 has its own electrical circuit 32, 33, 34 and 35 assigned to it respectively. Each electrical circuit is supplied by a separate additional battery 36 and by the vehicle battery 37 connected in parallel with these additional batteries 36.

The electrical circuit 32 assigned to the first pressure-medium circuit 6 is connected, by an electrical variable resistor 39.1 actuated by the foot-brake pedal 38, to the solenoids 12.1 and 13.1 of the valves 12 and 13 for the front-wheel brake, and also to the solehoid 27.1 of the trailer control valve 27.

Similarly, the electrical circuit 33 assigned to the second pressure-medium circuit 7 is connected, by a further electrical variable resistor 39.2 actuated by the foot-brake pedal 38, to the electrical actuating devices 17.1 and 18.1 of the valves 17 and 18 for the rear-wheel brake, and also to the electrical actuating device 27.1 of the trailer control valve 27. If an anti-skid system is used in the vehicle, the electrical signals can be supplied to the anti-skid device by an eltronic control unit 40, as shown in FIG. 1.

The electrical circuit 35 assigned to the third pressure-medium circuit 8 is connected, by a first electrical connection 35.1 and a signal generator 41, to the solenoid 23.1 of the valve 23 for the parking brake.

By means of a second electrical connection 35.2, current is supplied through a variable resistor 25 to the solenoid 27.1 of the trailer control valve 27. A third electrical connection 35.3 connects the variable resistor 26 to the electrical trailer coupling 42. Furthermore, the electrical trailer coupling 42 is supplied with current by the electrical variable resistor 29 through an electrical connection 35.4. The electrical circuit 34 assigned to the fourth pressure-medium circuit 9 is connected by a switch 43 to the electrical actuating device 30.1 of the valve 30 for the secondary consumer. Further electrical circuits are provided for further pressure-medium circuits in contemplated embodiments.

In the electrically pilot-controlled trailer portion of the braking system also illustrated in FIG. 1, a supply line 44 extending from the supply-line coupling head 10 leads to the pilot relay 45 and to another relay 46, the pilot relay 45 and elay 46 together being designated as the trailer brake valve 47. The pressure-medium control line 48 leads from the control-line coupling head 28 to the relay 46 through a throttle or one-way valve 49. Another pressure-medium control line 50 connects the pilot relay 45 and the relay 46. The electrical control line 51 leads from the electrical trailer coupling 42 to the pilot relay 45. The electric circuits are isolated from one another by diodes 55, as are the additional batteries and the vehicle battery.

When actuated normally, the braking system operates as follows: the compressor 2 driven by the internal-combustion engine of the vehicle supplies a specific supply pressure to the supply lines 6, 7, 8 and 9 through the four-circuit safety valve 5 and fills the storage vessels 11, 16, 21 and 52. In a driving situation, the electrical circuits 32.1 and 33.1 of the service brake are non-conducting and the pressure-medium is applied to the valves 12, 13 and 17, 18. When the resistance of the electrical variable resistors 39.1 and 39.2 is changed by depressing the foot-brake pedal 38, current flows in the electrical circuits 32.1 and 33.1 of the service brake. This current is proportional to the travel of the foot-brake pedal. Alternate embodiments of the present invention provide that the two electrical variable resistors 39.1 and 39.2 have different electrical characteristics. A time delay between actuation of one variable resistor 39.1 and the other variable resistor.39.2 is also provided in contemplated embodiments.

The current thereby applied to the solenoids 12.1, 13.1 and 17.1, 18.1 of the valves 12, 13 and 17, 18 switches these valves 12, 13 and 17, 18 to transmission according to the amount of current applied. The pressure-medium flowing through the valves 12, 13 and 17, 18 enters the brake cylinders 14, 15 and 19, 20 and causes braking that is proportional to the current applied. Since the two electrical circuits 32.1 and 33.1 also lead to the solenoid 27.1 of the trailer control valve 27, the pressure-medium regulated by the trailer control valve 27 is also transmitted. This pressure-medium is supplied to the control-line coupling head 28 for direct control and also loads the electrical variable resistor 29 which generates an analog electrical signal supplied to the electrical trailer coupling 42 for the additional indirect control of the trailer brake valve 47.

For the parking brake, the solenoid 23.1 and the pressure-regulating valve 23 are conducting in the driving mode, so that the valve 23 is switched to transmission, and the working spring of the brake cylinder 24 is tensioned by means of compressed air and the wheel brake is thereby released.

The parking brake is actuated by a mechanical hand-actuated signal generator 41 which controls the solenoid 23.1 of the pressure-regulating valve 23, which is non-conducting in the braking mode. The brake cylinder 24 is bled in the braking mode.

The control of the trailer control valve 27 by the brake circuit of the parking brake is as follows: The pressure-medium regulated by the valve 23 loads the electrical variable resistor 25 that generates a current signal inversely proportional to the pressure. This current signal, like that of the service brake, is supplied to the solenoid 27.1 of the trailer control valve 27.

The electrical solution for ensuring contact-breaking protection is described below. In the event of a pressure drop, the electrical variable resistor 26 controlled by the supply pressure of the third pressure-medium circuit 8.1.1 supplies an inversely proportional electrical current to the electrical trailer coupling 42 and consequently actuates the trailer brake 47.

The trailer brake operates in the following manner: Pressure-medium is supplied to the pilot relay 45 and to the relay 46 by means of the supply line 44. During braking of the vehicle, the pilot relay 45 receives a current signal from the electrical coupling 42 and switches to transmission according to the current signal received. The pressure-medium thereby regulated by the pilot relay 45 is then applied to the relay 46 and switches this relay 46 to transmission in proportion to the regulated pressure medium. As a result, the pressure medium arrives at the brake cylinders 53 and causes braking. In addition, the pressure-medium regulated by the trailer control valve 27 also arrives at the relay 46 through the control-line coupling head 28, but with a delay because of the time required for pressure to build up in the pressure-medium control line 48. To prevent the pressure build-up in the pressure-medium control line 48 from being influenced by the regulated pressure-medium of the pressure-medium control line 50, a throttle 49 is provided in the pressure-medium control line 48.

Thus, the electrical signal transmitted by the two service-brake circuits, the parking brake and the contact-breaking protection device, in addition to the electrical trailer coupling 42, is used for the indirect control of the trailer brake valve 47, thereby allowing a rapid response of the trailer brake. Because of the short response time of the trailer brake, it is possible for the trailer to be braked at the same time as the vehicle and the trailer is prevented from colliding into the back of the vehicle. Maximum possible safety is therefore achieved by means of this additional electrical control of the trailer brake valve.

The signal generator 41 for the parking brake is connected to an electrical trailer coupling 56 that provides an electrical signal for the indirect control of the trailer parking brake (not shown).

Figure 2:
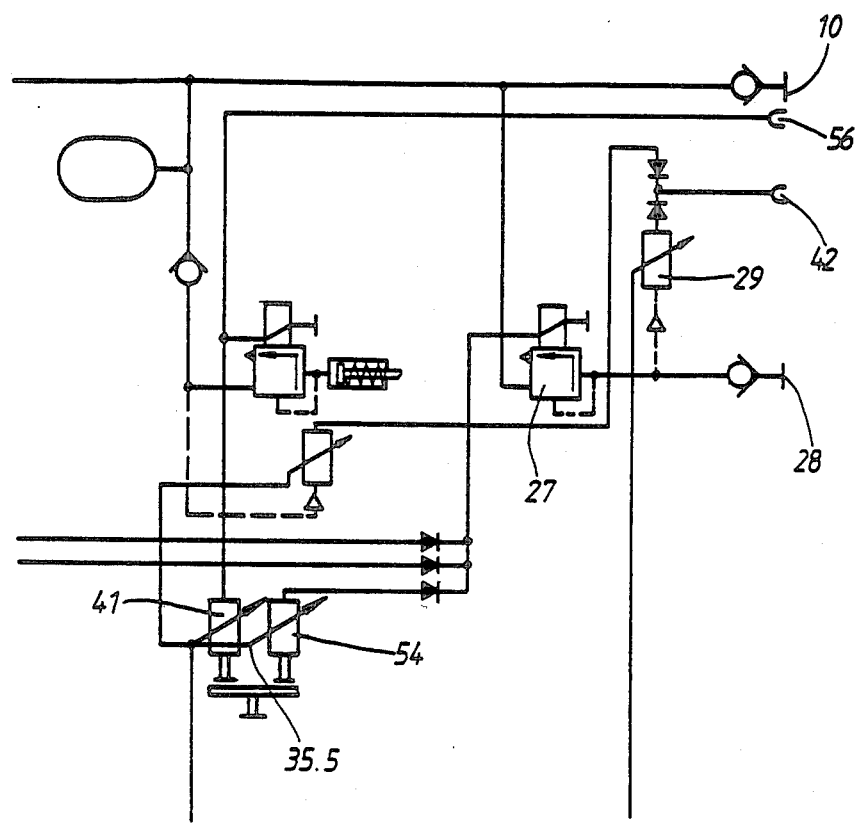
FIG. 2 shows a further embodiment of a part of the embodiment of FIG. 1.

FIG. 2 illustrates, in a modified embodiment of part of the circuit of FIG. 1, a further possibility of controlling the trailer control valve. Here, the mechanically actuated signal generator 41 has assigned to it a second electrical variable resistor 54 which is connected by branch line 35.5 and which controls the trailer control valve 27 in the manner described above. The effect is the same as in the variable resistor 25 shown in FIG. 1, However, the second electrical variable resistor 54 is not loaded by a pressure-medium as is the variable resistor 25 in the embodiment of FIG. 1.

From the preceding description of the preferred embodiments, it is evident that the objects of the invention are attained, and although the invention has been described and illustrated in detail, it is to be clearly understood that the same is by way of illustration and example only and is not to be taken by way of limitation. The spirit and scope of the invention are to be limited only by the terms of the appended claims.

What is claimed is:

1. A multiple circuit pressure-medium braking system for vehicle and trailer combinations, comprising:
   plurality of pressure-medium circuits;
   pressure-medium supply means for supplying a pressure-medium;
   a plurality of additional batteries, wherein each of said plurality of electrical circuits includes a primary vehicle battery and at least one additional battery connected in parallel with said primary vehicle battery;
   a plurality of electrical circuits, each of said electrical circuits controlling the flow of said pressure-medium in a corresponding one of said pressure-medium circuits;
   a multi-circuit safety valve means for controlling the supply of said pressure-medium to said pressure-medium circuits;
   trailer brake valve means controlling the supply of said pressure-medium to a brake cylinder of said trailer;
   trailer control valve means fluidically connected to said trailer brake valve means for fluidically controlling the operation of said trailer brake valve means; and
   variable resistor means connected to said trailer brake valve means for electrically controlling the operation of said trailer brake valve means;
   wherein said trailer control valve means fluidically controls the actuation of said variable resistor means for electrically controlling said trailer brake valve means.

2. The system of claim 1, wherein said electric circuit corresponding to said pressure-medium circuit for a parking brake of said vehicle includes a first electrical regulating means for regualting said pressure-medium in said trailer control valve means and a second electrical regulating means for regulating said pressure medium in said parking brake of said vehicle, the operation of said first electrical regulating means being controlled by said pressure-medium of said vehicle parking brake.

3. The system of claim 1, wherein one of said electrical circuits corresponding to the pressure-medium circuit for a parking brake of said vehicle includes: a first electrical regulating means for regulating said pressure-medium in said trailer control valve means; and a second electrical regulating means for regulating the said pressure medium in said parking brake of said vehicle, and means for simultaneously operating said first and second electrical regulating means.

4. The system of claim 3, wherein one of said pressure-medium circuits includes a storage vessel and a one way valve means connected between said storage vessel and said vehicle parking brake.

5. The system of claim 4, wherein said vehicle includes a plurality of brake cylinders, and each said pressure-medium circuit includies a pressure-regulating valve in front of one of said vehicle brake cylinders and said trailer brake cylinder in flow direction.

6. The system of claim 5, wherein said pressure-regulating valves have an analog control means for converting an electrical signal into an analog signal proportional to said pressure-medium.

7. The system of claim 1, further comprising an additional circuit which includes said variable resistor means for electrically controlling said trailer brake valve means.

8. The system of claim 1, wherein said additional batteries are isolated from said primary vehicle battery by diode means.

9. The system of claim 1, wherein said additional batteries have a smaller current capacity than said primary vehicle battery.

10. The system of claim 1, further comprising an electrical regulating means for transmitting an electrical signal which operates said trailer brake valve means when there is a drop in pressure in said pressure medium.

11. The system of claim 1, wherein said pressure-medium circuits include pressure-regulating valves in said pressure-medium circuits.

12. The system of claim 1, wherein said plurality of electrical circuits are isolated from one another by diode means.

13. The system of claim 1, wherein a separate pressure-medium circuit is provided for the set of front wheel brake cylinders of said vehicle and the rear wheel brake cylinders of said vehicle respectively, and said electrical circuits corresponding to said pressure-medium circuits respectively each include an electrical regulating means operable by a common operating means.

14. The system of claim 13 wherein said common operating means is a brake pedal.

15. The system of claim 13, wherein said electrical regulating means of said circuits have electrical characteristics different from one another such that the separate pressure-medium circuits for the front wheel brake cylinders and for the rear wheel brake cylinders are regulated differently from one another by the respective said electrical regulating means.

16. The system of claim 13, wherein said common operating means actuates the electrical regulating means in said electrical circuit corresponding to said front wheel brake pressure-medium circuit after a time delay relative to the actuation of said electrical regualting means of said electrical circuit corresponding to said rear-wheel brake pressure-medium circuit.

17. The system of claim 13, wherein said electrical regulating means includes variable resistors.

18. The system of claim 1, wherein said electrical circuit corresponding to said pressure-medium circuit for a parking brake of said vehicle includes an electrical trailer coupling means for the control of a parking brake in said trailer.

* * * * *